Figure 1:
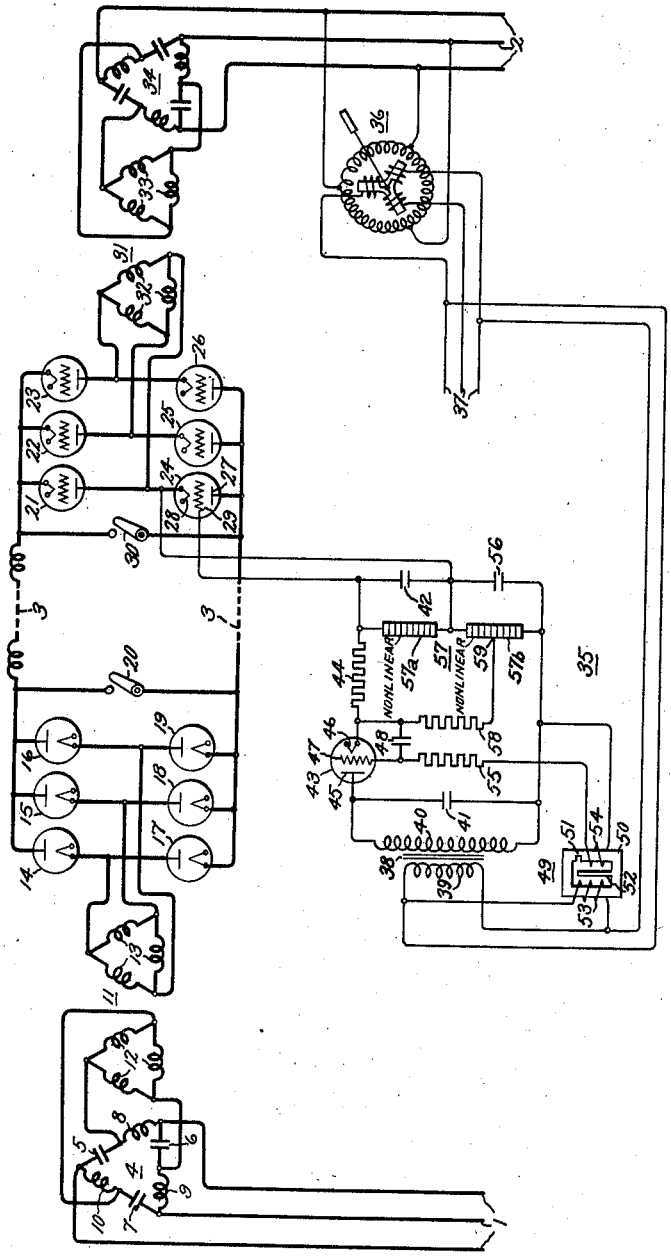

May 28, 1940.   B. D. BEDFORD   2,202,726
ELECTRIC VALVE CIRCUIT
Filed Oct. 19, 1937   2 Sheets-Sheet 2

Inventor:
Burnice D. Bedford,
by Harry E. Dunham
His Attorney.

Patented May 28, 1940

2,202,726

UNITED STATES PATENT OFFICE 2,202,726

ELECTRIC VALVE CIRCUIT

Burnice D. Bedford, Schenectady, N. Y., assignor to General Electric Company, a corporation of New York Application October 19, 1937, Serial No. 169,833

21 Claims. (Cl. 250—27)

My invention relates to electric valve circuits and more particularly to control or excitation circuits for electric valve translating apparatus.

In the control of electric valves, particularly electric valves of the type employing an ionizable medium, it has been found that in order to obtain the desired precision and accuracy of operation the voltages impressed on the control members of the electric valves should be of a wave form having a substantially perpendicular wave front. Heretofore in many instances the control voltages have been obtained by employing saturable inductive devices which generate an alternating voltage of peaked wave form; and although these devices have operated satisfactorily, it has been found in the control of electric valve inverter circuits for high voltage direct current transmission systems that in order to obtain the desired precision of control, the size and rating of the saturable inductive devices become inordinate relative to the size and rating of the associated main power equipment. Furthermore, in the control of electric valves employing ionizable mediums it is usually necessary to provide suitable apparatus for impressing on the control members a negative unidirectional biasing potential which maintains the electric valves nonconductive until a positive control voltage overcomes the effect of the bias voltage to render the valves conductive at recurring predetermined instants. In view of the above factors, it has become evident that there is a decided need for improved control or excitation circuits which not only supply suitable periodic voltages of perpendicular wave front by using apparatus of the proper proportions but also supply suitable negative unidirectional biasing potentials without employing excessive auxiliary equipment.

It is an object of my invention to provide a new and improved electric valve circuit.

It is another object of my invention to provide a new and improved control or excitation circuit for electric valve apparatus.

It is a further object of my invention to provide a new and improved electric valve circuit for generating periodic electrical quantities.

It is a still further object of my invention to provide a new and improved control circuit for electric valves in which there is impressed on the control members of the electric valves alternating voltages of perpendicular wave front and which also impresses on the control members suitable negative unidirectional biasing potentials.

In accordance with one feature of the illustrated embodiments of my invention, I provide an improved excitation circuit, for electric valve apparatus, which impresses on the control members of a main or power electric valve voltages of perpendicular wave front. The excitation circuit includes a source of alternating voltage and a control electric valve connected between the source and the control member for the main electric valve to impress thereon the voltage of perpendicular wave front. The control electric valve is provided with a control member, such as a grid, which renders the electric valve conductive, and there is also provided a suitable inductive device, such as a peaking transformer, which is energized from the source and which impresses on the grid of the control electric valve a voltage to render the control electric valve conductive in the region of the maximum voltage of the source. An impedance element is connected in series relation with the control electric valve and the source, and the voltage appearing across this element is impressed across the control member and the cathode of the main or power electric valve.

In accordance with another feature of the illustrated embodiments of my invention, I provide an improved excitation circuit, for electric valve apparatus of the type employing an ionizable medium, which impresses on the control member of a main or power electric valve a voltage of perpendicular wave front and which also impresses on the control member a negative unidirectional biasing potential. The excitation circuit, which is an electric valve circuit for generating a periodic voltage of perpendicular wave front, includes a source of alternating voltage, a capacitance which is connected across the source and arranged to be charged therefrom, an impedance element having a nonlinear impedance current characteristic and a control electric valve which is connected between the capacitance and the impedance element for effecting discharge of the capacitance through the impedance element at predetermined times to impress on the control member of the main or power electric valve a periodic control voltage of perpendicular wave front. The control electric valve is provided with a control member or grid which is properly energized to render the valve conductive at the desired instants. To render the control valve conductive at a most desirable time, that is within the region of the maximum voltage of the alternating current source, I employ a saturable inductive device which is connected to the source and which supplies an alternating voltage of peaked wave form which occurs within the region of the maximum value of the voltage of the source.

In accordance with other illustrated features of my invention, various arrangements supply unidirectional biasing potentials to the control members of both the main electric valve and the control electric valve, thereby eliminating the necessity for an excessive amount of auxiliary control equipment for this purpose.

Figure 2:
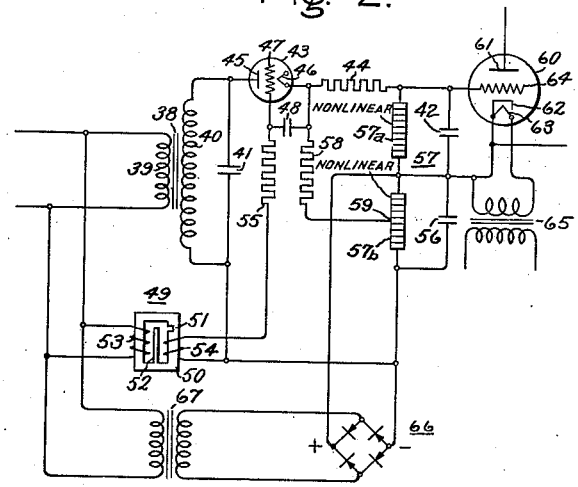
Figure 3:
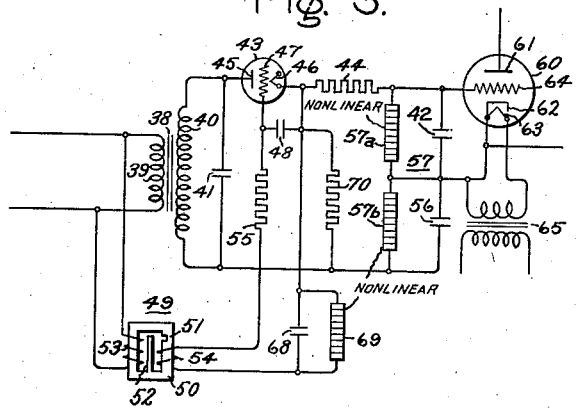

For a better understanding of my invention, reference may be had to the following description taken in connection with the accompanying drawings and its scope will be pointed out in the appended claims. Fig. 1 of the accompanying drawings diagrammatically illustrates an embodiment of my invention as applied to an electric valve direct current transmission system, and Figs. 2 and 3 represent certain modifications of the control or excitation circuit shown in Fig. 1.

In Fig. 1 of the accompanying drawings there is diagrammatically illustrated an embodiment of my invention as applied to an electric power transmission system of the type disclosed and claimed in United States Letters Patent No. 1,990,758 granted February 12, 1935, on application of Charles W. Stone and assigned to the assignee of the present application. Although my invention in its broader aspects is applicable to electric valve translating systems generally, for purposes of illustration it has been shown as applied to a specific system. The electric valve translating system shown in Fig. 1 is employed to transmit energy from a constant voltage alternating current circuit 1 to a constant voltage alternating current circuit 2 through translating apparatus which effects transfer of energy over a transmission line 3 in the form of constant current direct current. To transform constant voltage alternating current to alternating current of constant value, there is connected to the circuit 1 a monocyclic network 4 which comprises a plurality of branches of serially connected reactances of opposite sign, such as capacitances 5, 6 and 7 which are respectively connected in series relation with inductances 8, 9 and 10. Output terminals of the monocyclic network 4 are connected to a transformer 11 having primary windings 12 and secondary windings 13. The transformer 11 is employed to effect the proper voltage transformation of the constant current output of the monocyclic network 4 and connects the monocyclic network 4 to electric valves 14–19 which operate as a full wave rectifier to transform the alternating current of constant value to constant current direct current. The electric valves 14–19 are preferably of the type employing an ionizable medium, such as a gas or a vapor. A suitable circuit controlling means, such as a switch 20, may be connected across electric valves 14–19, to short circuit the transmission line 3 to limit the magnitude of the voltage of the system during the starting operation. At the receiving end of the transmission system an electric valve apparatus, including electric valves 21–26, is employed to invert the constant current direct current to alternating current of constant value. Each of the electric valves 21–26 includes an anode 27, a cathode 28 and a control member 29. The electric valves 21–26 are also of the type employing an ionizable medium, such as a gas or a vapor. A switch 30 may also be connected across the transmission line 3 at the receiving end to limit the voltage thereof during starting or controlling operations. The broad feature of controlling a transmission system of this type by means of short circuiting devices connected at the sending and receiving ends of the transmission system is disclosed and claimed in United States Letters Patent No. 1,990,759 granted February 12, 1935, on application of Charles W. Stone and assigned to the assignee of the present application. A transformer 31 having primary windings 32 and secondary windings 33 connect the electric valve aggregate at the receiving end to a monocyclic network 34 which transforms the alternating current of constant value to constant voltage alternating current. The monocyclic network 34 at the receiving end of the transmission system also includes a plurality of branches of serially connected reactances of opposite sign and functions in a manner essentially similar to the monocyclic network 4 at the sending end.

Since the electric valve apparatus at the receiving end, including electric valves 21–26, operates as an inverter to transform direct current into alternating current, it is necessary that the electric valves be controlled by the proper energization of the control members 29. For the purpose of facilitating the description of the excitation circuits, I have illustrated only one excitation circuit for the electric valves 21–26; that is, excitation circuit 35 which is associated with electric valve 24 is diagrammatically shown. It is to be understood that similar excitation circuits are associated with the other electric valves of the electric valve inverter apparatus.

In order to obtain a polyphase system of voltages, namely a 3 phase system of voltages which may be employed to properly energize the control members 29 of electric valves 21–26 to render the valves conductive in a predetermined order, I employ a suitable phase shifting device such as a rotary phase shifter 36 which is connected to the constant voltage alternating current circuit 2 and which energizes a three phase constant voltage alternating current circuit 37. It is to be understood that I may employ, if desired, any other suitable source of alternating current correlated in phase and frequency with respect to the voltage of the constant voltage circuit 2. A transformer 38 having a primary winding 39 and a secondary winding 40 is employed as the source of alternating current for the excitation circuit 35. A capacitance 41 may be connected across the terminals of secondary winding 40 of transformer 38 in those applications where it is desirable to obtain a voltage of perpendicular wave front and where it is important to obtain a substantial current. It is to be understood that in its broader aspects my invention is not limited to an arrangement including a capacitance across the source of alternating voltage. To obtain a periodic voltage of perpendicular wave front for energizing control member 29 of electric valve 24, I connect control member 29 to excitation circuit 35 in any suitable manner to be energized in accordance with the periodic voltage generated by circuit 35. A suitable impedance element, such as a capacitance 42, may be connected in series relation with the secondary winding 40 of transformer 38 and the voltage appearing across the capacitance 42 may be impressed across the cathode 28 and control member 29 of electric valve 24. The capacitance 42 also serves to suppress extraneous transient voltages which may be present in excitation circuit 35. A control electric valve 43 is rendered conductive periodically to produce a periodic voltage of perpendicular wave front. A current limiting resistance 44 may be connected in series relation with the capacitance 42. The electric valve 43 is preferably of the type employing an ionizable medium, such as a gas or a vapor, and includes an anode 45, a cathode 46 and a control member 47. A capacitance 48 may be connected across the cathode 46 and the control member 47 to absorb extraneous transient voltages which may be present in the excitation circuit 35. While I have chosen to illustrate my invention as applied to an excitation circuit in which impedance elements are connected in series relation with the control electric valve 43, it is to be understood that these impedance elements need not be employed and that the cathode 28 and control member 29 of electric valve 24 may be energized in accordance with the periodic voltage of perpendicular wave form generated by control electric valve 43 when it is rendered conductive periodically, in which case the control member 29 will be connected to cathode 46 of valve 43 and the cathode 28 will be connected to the lower terminal of secondary winding 40 of transformer 38. It is desirable to render the electric valve 43 conductive within the region of the maximum value of voltage of the source in order to impress across control member 29 and cathode 28 of electric valve 24 a relatively large voltage of substantially perpendicular wave front. To effect this control by using a minimum amount of apparatus and to dispense with the necessity of employing auxiliary phase shifting equipment, I provide a saturable inductive device 49 which generates an alternating voltage of peaked wave form, the maximum values of which occur when the voltage is maximum. The saturable inductive device 49 includes a core member 50 having a restricted highly saturable portion 51 and a shunt path 52. A primary exciting winding 53 is connected to a proper phase of the alternating current circuit 37 and a secondary winding 54 produces an alternating voltage of peaked wave form which is impressed on control member 47 of electric valve 43 through a current limiting resistance 55. The excitation circuits (not shown) for electric valves 21–23 and 25 and 26 are connected to the proper phases of circuit 37.

A capacitance 56 is connected in series with electric valve 43 to provide negative unidirectional biasing potentials for both electric valves 24 and 43. An impedance element 57, preferably an impedance element of the type having a non-linear impedance-current characteristic, may be connected across capacitance 56 and capacitance 42. The impedance element 57 may be arranged in two portions, 57a and 57b, and may be of a resistive material such as that described and claimed in United States Letters Patent No. 1,822,742 granted September 8, 1931, upon an application of Karl B. McEachron and assigned to the assignee of the present application. Portion 57b may be considered to be a voltage divider provided with an electrical intermediate tap 59 which is connected to control member 29 of electric valve 24 through resistance 44 and a current limiting resistance 58. The upper part of the nonlinear impedance portion 57b impresses a negative unidirectional biasing potential on control member 29 of electric valve 24, and the lower part of this impedance impresses a negative unidirectional biasing potential on grid 47 of electric valve 43. Portion 57a of the nonlinear impedance 57 serves as a protective device for electric valve 24 to limit the voltage appearing between cathode 28 and control member 29 under fault conditions and also serves as a discharge circuit for capacitance 42.

The general principles of operation of the embodiment of my invention shown in Fig. 1 will be considered when the system is operating to transmit energy from the constant voltage alternating current circuit 1 to the constant voltage alternating current circuit 2. For a detailed description of the operation of the system, reference may be had to the above mentioned Stone patents. Electrical energy in the form of constant current direct current is transmitted over the transmission line 3 and the electric valves 21–26 invert the constant current direct current to alternating current of constant value, and the monocyclic network 34 transforms the alternating current of constant value to constant voltage alternating current. The electric valves 21–26 are rendered conductive in a predetermined order. This sequential and periodic energization of the electric valves is effected by excitation circuits which properly energize the control members 29 and of which the excitation circuit 35 associated with electric valve 34 is representative.

Excitation circuit 35 operates to impress on control member 29 of electric valve 24 a voltage of proper magnitude and of substantially perpendicular wave front to render electric valve 24 conductive at accurately determinable instants. The rotary phase shifter 36 is adjusted so that the phase of the alternating voltage appearing across the terminals of secondary winding 40 of transformer 38 is such that proper energization of the control member 29 is obtained. The alternating voltage of peaked wave form generated by secondary winding 54 of the saturable inductive device 49 renders the control electric valve 43 conductive when the charge on the capacitance 41 is maximum, and that is, of course, at the time when the voltage of winding 40 is also maximum. Due to the presence of the highly saturated restricted portion 51, the rate of change of flux linking the secondary winding 54 will be maximum in the region of the maximum voltage appearing across the terminals of secondary winding 43, inducing in secondary winding 54 a voltage of peaked wave form. When electric valve 43 is rendered conductive the capacitance 41 discharges through a circuit including the anode-cathode circuit of electric valve 43, resistance 44, and portions 57a and 57b of the nonlinear impedance element. During the discharge of the capacitance 41, the capacitance 56 is charged and thereby provides a source of negative unidirectional biasing potential. The potential appearing across capacitance 42 is of substantially perpendicular wave front and is impressed across control member 29 and cathode 28 of electric valve 24 to render the electric valve conductive.

Due to the fact that the upper plate of capacitance 56 is charged positively relative to the lower plate, the potential of the point 59 of portion 57b of the nonlinear resistance is negative relative to the upper terminal of this portion of the impedance element and is less negative than the lower terminal of the impedance element. Therefore, there is impressed on control member 47 of electric valve 43 a negative unidirectional biasing potential through a circuit including a resistance 55, a secondary winding 54 of device 49, the portion of impedance element 57b between the lower terminal and point 59, resistance 58 and cathode 46. In like manner, there is impressed on control member 29 of electric valve 24 a negative unidirectional biasing potential through a circuit including resistance 44, resistance 58, the portion of nonlinear impedance element 57b between point 59 and the common juncture of portions 57a and 57b, and cathode 28. The negative unidirectional biasing potentials serve to maintain the electric valves 24 and 43 nonconductive except during those intervals when the valves are rendered conductive by the positive voltages produced by control electric valve 43 and the secondary winding 54 of device 49, respectively.

In Fig. 2 there is diagrammatically shown another embodiment of my invention as applied to an electric valve 60 having an anode 61, a cathode 62, a cathode heating element 63 and a control member 64. The excitation circuit for electric valve 60 is similar in many respects to excitation circuit 35 shown in Fig. 1 and corresponding elements have been assigned like reference numerals. A cathode heating transformer 65 may be employed to energize the cathode heating element 63 and may be energized from any suitable source. To provide an additional arrangement for producing the negative unidirectional biasing potentials, I employ a suitable rectifier 66 which may be connected to a transformer 67 which may be energized from a suitable source of alternating current and is shown as being connected in parallel with primary winding 39 of transformer 38. The rectifier 66 circulates a unidirectional current through portion 57b of the nonlinear impedance element and thereby establishes a voltage which aids the unidirectional biasing potential established by the capacitance 56.

The operation of the embodiment of my invention shown in Fig. 2 is essentially the same as that explained in connection with excitation circuit 35 of Fig. 1. The capacitance 41 is periodically discharged by the electric valve 43 to generate across the terminals of portion 57a of the nonlinear impedance element a suitable voltage of perpendicular wave front to render electric valve 60 conductive. Capacitance 56 and portion 57b of the nonlinear impedance element operate to impress unidirectional biasing potentials on the control members 47 and 64 of electric valves 43 and 60, respectively. The rectifier 66 circulates a unidirectional current through portion 57b of the nonlinear impedance element to generate a biasing potential which assists that produced by the capacitance 56. It is to be noted that the nonlinear impedance-current characteristic of the portion 57b operates to maintain the negative unidirectional biasing potentials within a predetermined range of values due to the nonlinear characteristic of the material.

Fig. 3 of the accompanying drawings diagrammatically shows another embodiment of my invention. The excitation circuit shown in Fig. 3 is substantially the same as that shown in Fig. 2 and corresponding elements have been assigned like reference numerals. As an agency for impressing on control member 47 of electric valve 43 a negative unidirectional biasing potential, I employ a parallel connected capacitance 68 and a nonlinear impedance element 69. The capacitance 68 and the impedance element 69 operate as a self-biasing type circuit due to the rectifying action of the control member 47 and the cathode 46. In the arrangement of Fig. 3, the negative unidirectional biasing potential for control member 64 of electric valve 60 is obtained by utilizing the negative biasing voltage produced by capacitance 56 and the impedance element 57b. The negative potential produced by the capacitance 56 is impressed on control member 64 through a circuit including a resistance 70 which is connected between the lower terminal of impedance 57b and the cathode 46 of electric valve 43.

The operation of the embodiment of my invention shown in Fig. 3 is substantially the same as that explained above in connection with the excitation circuits of Figs. 1 and 2. The capacitance 41 is periodically discharged through the nonlinear impedances 57a and 57b and resistance 44. The voltage appearing across the terminals of the nonlinear impedance 57a is impressed across cathode 62 and control member 64 of electric valve 60 to render valve 60 conductive. During the discharge of the capacitance 41, the capacitance 56 is charged so that the lower plate thereof is negative in potential relative to the upper plate, impressing on control member 64 a negative unidirectional biasing potential through a circuit including resistance 44 and resistance 70. When the control electric valve 43 is rendered conductive by the saturable inductive device 49, the positive current which flows in the control circuit therefor establishes a charge on capacitance 68 to maintain the lower plate thereof negative in potential relative to the upper plate. Of course, the capacitance 68 is discharged through the nonlinear impedance element 69; and the impedance element 69, by virtue of its nonlinearity, serves to maintain the biasing potential at a substantially constant value or within a predetermined range of values. The circuit through which the negative potential is impressed on control member 47 includes secondary winding 54 of device 49 and resistance 55.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent in the United States is:

1. In combination, an electric valve means having a control member, and an excitation circuit for energizing said control member comprising a source of alternating current, a capacitance connected directly across said source and arranged to be charged therefrom, an impedance element, a second electric valve having an anode, a cathode and a control member, means for connecting the anode-cathode circuit of said second electric valve between said capacitance and said impedance element for discharging said capacitance through said impedance element, means for energizing said first mentioned control member in response to a voltage derived from said impedance element, and means including a saturable inductive device connected to said source for impressing on said control member of the second electric valve an alternating voltage of peaked wave form to render the second valve conductive in the region of the maximum value of the voltage of said source.

2. In combination, an electric valve means having a control member, an excitation circuit for energizing said control member comprising a source of alternating current, a capacitance connected directly across said source and arranged to be charged therefrom, an impedance element having a nonlinear current-impedance characteristic, a second electric valve having an anode, a cathode and a control member, means for connecting the anode-cathode circuit of said second electric valve between said capacitance and said impedance element for discharging said capacitance through said impedance element, means for energizing said first mentioned control member in resopnse to a voltage derived from said impedance element, and means including a saturable inductive device connected to said source for impressing on said control member of the second electric valve an alternating voltage of peaked wave form to render the second valve conductive in the region of the maximum value of the voltage of said source.

3. In combination, an electric valve means having a control member, a source of alternating current, a capacitance connected across said source and arranged to be charged therefrom, an impedance element having a non-linear impedance current characteristic, a second electric valve having an anode, a cathode and a control member, means for connecting the anode-cathode circuit of said second electric valve between said capacitance and said impedance element for discharging said capacitance through said impedance element, means for energizing said first mentioned control member to render said first mentioned electric valve conductive by a voltage derived from said impedance element during the discharge of said capacitance, and means including a second capacitance connected across at least a portion of said impedance element for impressing on said first mentioned control member and said second mentioned control member negative unidirectional biasing potentials.

4. In combination, an electric valve means having a control member, a source of alternating current, a capacitance connected across said source and arranged to be charged therefrom, an impedance element having a non-linear impedance current characteristic, a second electric valve having an anode, a cathode and a control member, means for connecting the anode-cathode circuit of said second electric valve between said capacitance and said impedance element for discharging said capacitance through said impedance element, means for energizing said first mentioned control member to render said first mentioned electric valve means conductive by a voltage derived from said impedance element during the discharge of said capacitance, means including a second capacitance connected across at least a portion of said impedance element for impressing on said first mentioned control member and said second mentioned control member negative unidirectional biasing potentials, and means including a saturable inductive device connected to said source for impressing on the control member of the second electric valve an alternating voltage of peaked wave form to render the second electric valve conductive in the region of the maximum value of the voltage of said source.

5. In combination, an electric valve having a control member, a source of alternating current, a capacitance connected to said source, an impedance element having a non-linear impedance current characteristic, a second electric valve having an anode, a cathode and a control member, means for connecting the anode-cathode circuit of said second electric valve to discharge said capacitance through said impedance element and to impress on the first mentioned control member a voltage derived from said impedance element to render the first mentioned electric valve conductive, and means for circulating a unidirectional current through at least a portion of said impedance element and to impress on said control members negative unidirectional biasing potentials.

6. In combination, an electric valve having a control member, a source of alternating current, a capacitance connected across said source and arranged to be charged therefrom, an impedance element having a non-linear impedance-current characteristic, means for discharging said capacitance through said impedance element including a second electric valve having an anode, a cathode and a control member, the anode-cathode circuit of said second electric valve being connected between said source and said impedance element, means for impressing a voltage derived from said impedance element on the control member of the first mentioned electric valve to render said valve conductive, and means for impressing on said control members negative unidirectional biasing potentials including means for circulating a unidirectional current through at least a portion of said impedance element.

7. In combination, an electric valve having a control member, a source of alternating current, a capacitance connected across said source and arranged to be charged therefrom, an impedance element, means including a second electric valve having an anode, a cathode and a control member, the anode-cathode circuit being connected between said capacitance and said impedance element, for discharging said capacitance through said impedance element and for producing a voltage to render the first mentioned electric valve conductive, means for circulating a unidirectional current through at least a portion of said impedance element and to impress on said control members negative unidirectional biasing potentials, and means including a saturable inductive device connected to said source for impressing on the control member of the first mentioned electric valve an alternating voltage to render said first mentioned electric valve conductive in the region of the maximum value of voltage of said source.

8. In combination, an electric valve having a control member, a source of alternating current, a capacitance connected across said source and arranged to be charged therefrom, an impedance element, means including a control electric valve having an anode-cathode circuit connected between said capacitance and said impedance element for periodically discharging said capacitance through said impedance element to generate across a portion of said impedance element a periodic voltage of substantially perpendicular wave front and for energizing said control member to render the first mentioned electric valve conductive, means including a second capacitance connected across at least a portion of said impedance element for impressing on said control member a negative unidirectional biasing potential, and means for circulating a unidirectional current through said last mentioned portion of said impedance element to generate a voltage which assists the potential established by the second capacitance.

9. In combination, an electric valve having a control member, a source of alternating current, a capacitance connected directly across said source, means including an impedance element for impressing on said control member a voltage of perpendicular wave front, a control electric valve having an anode, a cathode and a control member, means for periodically discharging said capacitance through said impedance element including means for connecting the anode-cathode circuit of said valve between said capacitance and said impedance element, means including a second capacitance connected across at least a portion of said impedance element for impressing a negative unidirectional biasing potential on said first mentioned control member, means for energizing the control member of said control electric valve to render said control electric valve conductive periodically, and means comprising a parallel connected capacitance and an impedance element connected in the circuit for the control member for said control electric valve for impressing on said control member a negative unidirectional biasing potential.

10. In combination, a source of current, a capacitance connected to be charged from said source, a discharge circuit for said capacitance comprising a serially connected resistive element having a non-linear resistance-current characteristic and a discharge valve having an anode, a cathode and a control member, means for connecting the anode-cathode circuit of said discharge valve in circuit with said resistive element, and means for impressing on said control member a voltage to render said discharge valve conductive periodically so that said capacitance is discharged through said resistive element thereby generating across said resistive element a periodic voltage of peaked wave form.

11. In combination, a source of current, a capacitance connected to be charged from said source, a discharge circuit for said capacitance comprising a serially connected resistive element having a non-linear resistance-current characteristic, an electric valve having an anode, a cathode and a control member, means for connecting the anode-cathode circuit of said electric valve in circuit with said resistive element, and means comprising a saturable inductive device connected directly across said source for impressing on said control member an alternating voltage of peaked wave form to render said electric valve conductive periodically thereby effecting discharge of said capacitance through said resistive element and generating across said element a periodic voltage of peaked wave form.

12. In a circuit for generating a periodic electrical quantity of perpendicular wave front, the combination of a source of alternating current, a capacitance connected across said source to be charged therefrom, a resistive element having a non-linear resistance-current characteristic, an electric valve having an anode, a cathode and a control member, means for connecting the anode-cathode circuit of said electric valve between said capacitance and said resistive element to discharge said capacitance periodically through said resistive element thereby generating across said resistive element a periodic voltage of peaked wave form, and means comprising a saturable inductive device connected directly to said source for impressing on said control member an alternating voltage of peaked wave form to render said electric valve conductive periodically.

13. In combination, a source of alternating current, an electric valve having a control member, means including a control electric valve having an anode-cathode circuit connected between said source and said control member for effecting periodic energization thereof, said control electric valve being provided with a grid for controlling the conductivities thereof, a capacitance connected in series relation with said source and said control electric valve and arranged to be charged periodically from said source, means including a voltage divider connected across said capacitance for impressing on said control member and on said grid negative unidirectional biasing potentials, and means including a transformer of the saturable type connected to be energized from said source for impressing on said grid an alternating voltage of peaked wave form to render said control electric valve conductive in the region of maximum positive values of voltage of said source.

14. In combination, a source of alternating current, an electric valve having a control member, means including a control electric valve having an anode-cathode circuit connected between said source and said control member for effecting periodic energization thereof, said control electric valve being provided with a grid for controlling the conductivity thereof, means including a capacitance connected in series relation with said source and the anode-cathode circuit of said control electric valve and arranged to be charged peiodically from said source through said control electric valve to impress on said grid a negative unidirectional biasing potential, and means including a saturable inductive device connected directly across said source for impressing on said grid a periodic voltage of peaked wave form occurring at approximately the maximum value of voltage of said source.

15. In combination, an electric valve having a control member, a source of alternating current, an impedance element, a control electric valve having a grid and an anode-cathode circuit connected to transmit current periodically through said impedance element to produce a periodic voltage for energizing said control member, and means including means for circulating a unidirectional current through at least a portion of said impedance element to impress negative unidirectional biasing potentials on said control member and on said grid.

16. In combination, an electric valve having a control member, a source of alternating current, an impedance element, means including a control electric valve having a grid and an anode-cathode circuit connected to transmit current periodically through said impedance element to produce a periodic voltage for energizing said control member, means including means for circulating a unidirectional current through at least a portion of said impedance element to impress negative unidirectional biasing potentials on said control member and on said grid, and means including a saturable inductive device connected to said source for impressing on said grid a periodic voltage of peaked wave form.

17. In combination, an electric valve having a control member, a source of alternating current, an impedance element, means including a control electric valve having a grid and an anode-cathode circuit connected to transmit current periodically to said impedance element for producing a periodic voltage for energizing said control member, and means comprising a rectifier for circulating a unidirectional current through said impedance element to impress a negative unidirectional biasing potential on said grid.

18. In combination, an electric valve having a control member, a source of alternating current, an impedance element, means including a control electric valve having a grid and an anode-cathode circuit connected to transmit current periodically to said impedance element to produce a periodic voltage for energizing said control member, means comprising a rectifier energized from said source for circulating a unidirectional current through said impedance element to impress a negative unidirectional biasing potential on said grid, and means including a saturable inductive device connected to said source for impressing a periodic voltage of peaked wave form on said grid.

19. In combination, an electric valve having a control member for controlling the conductivity thereof, a source of alternating current, means including a control electric valve connected to said source for producing a periodic voltage to energize said control member, said control electric valve having an anode-cathode circuit connected to said control member and having a grid for controlling the conductivity thereof, means including a saturable inductive device energized from said source for producing a periodic voltage of peaked wave form to energize said grid, and means including self-biasing means connected in series relation with said grid and said inductive device for impressing a negative unidirectional biasing potential on said grid.

20. In combination, an electric valve having a control member, a source of alternating current, a capacitance, means including a control electric valve having an anode-cathode circuit connected between said source and said capacitance for periodically charging said capacitance from said source, said control electric valve having a grid for controlling the conductivity thereof, means including a saturable inductive device energized from said source for producing a periodic voltage of peaked wave form to energize said grid, means for impressing on said control member a negative unidirectional biasing potential derived from said capacitance, and self-biasing means connected in series relation with said grid and said inductive device for impressing a negative unidirectional biasing potential on said grid.

21. In combination, a source of current, a capacitance connected to be charged from said source, a discharge circuit for said capacitance comprising a serially connected impedance element having a negative impedance-current characteristic and a discharge valve having an anode, a cathode and a control member, means for connecting the anode-cathode circuit of said discharge valve in circuit with said impedance element, and means for impressing on said control member a voltage to render said discharge valve conductive periodically thereby discharging said capacitance through said impedance element and producing across said element a voltage of peaked wave form.

BURNICE D. BEDFORD.